United States Patent [19]

Redshaw

[11] 4,035,093

[45] July 12, 1977

[54] BI-DIRECTIONAL ADJUSTABLE COUPLINGS

[75] Inventor: Charles Gordon Redshaw, Bellevue, Wash.

[73] Assignee: The Boeing Company, Seattle, Wash.

[21] Appl. No.: 662,982

[22] Filed: Mar. 1, 1976

[51] Int. Cl.² ............................... F16B 19/00
[52] U.S. Cl. .................................... 403/4; 403/388; 403/408; 16/129
[58] Field of Search ............... 33/174 TB; 248/287; 52/758 F, 758 N; 403/408, 4, 13, 388; 16/129, 130, 133

[56] References Cited

U.S. PATENT DOCUMENTS

| 686,025 | 11/1901 | Cannon | 16/133 |
| 799,503 | 9/1905 | Tripp | 16/130 |
| 2,027,888 | 1/1936 | Solomon | 16/130 |
| 2,615,194 | 10/1952 | Kreiner | 16/129 |
| 2,746,780 | 5/1956 | Comino | 403/4 |
| 3,019,472 | 2/1962 | Wasmuth | 16/129 |
| 3,828,515 | 8/1974 | Galgoczy | 403/388 X |

Primary Examiner—Andrew V. Kundrat
Attorney, Agent, or Firm—Morris A. Case; Bernard A. Donahue

[57] ABSTRACT

A pair of members, one of which has a multiplicity of projections extending therefrom in a uniform geometric pattern with the projections aligned bi-directionally at 90°, and the other member has a multiplicity of recesses arranged to mate with the projections to allow bi-directional adjustment and also locking when the members are fastened together.

11 Claims, 12 Drawing Figures

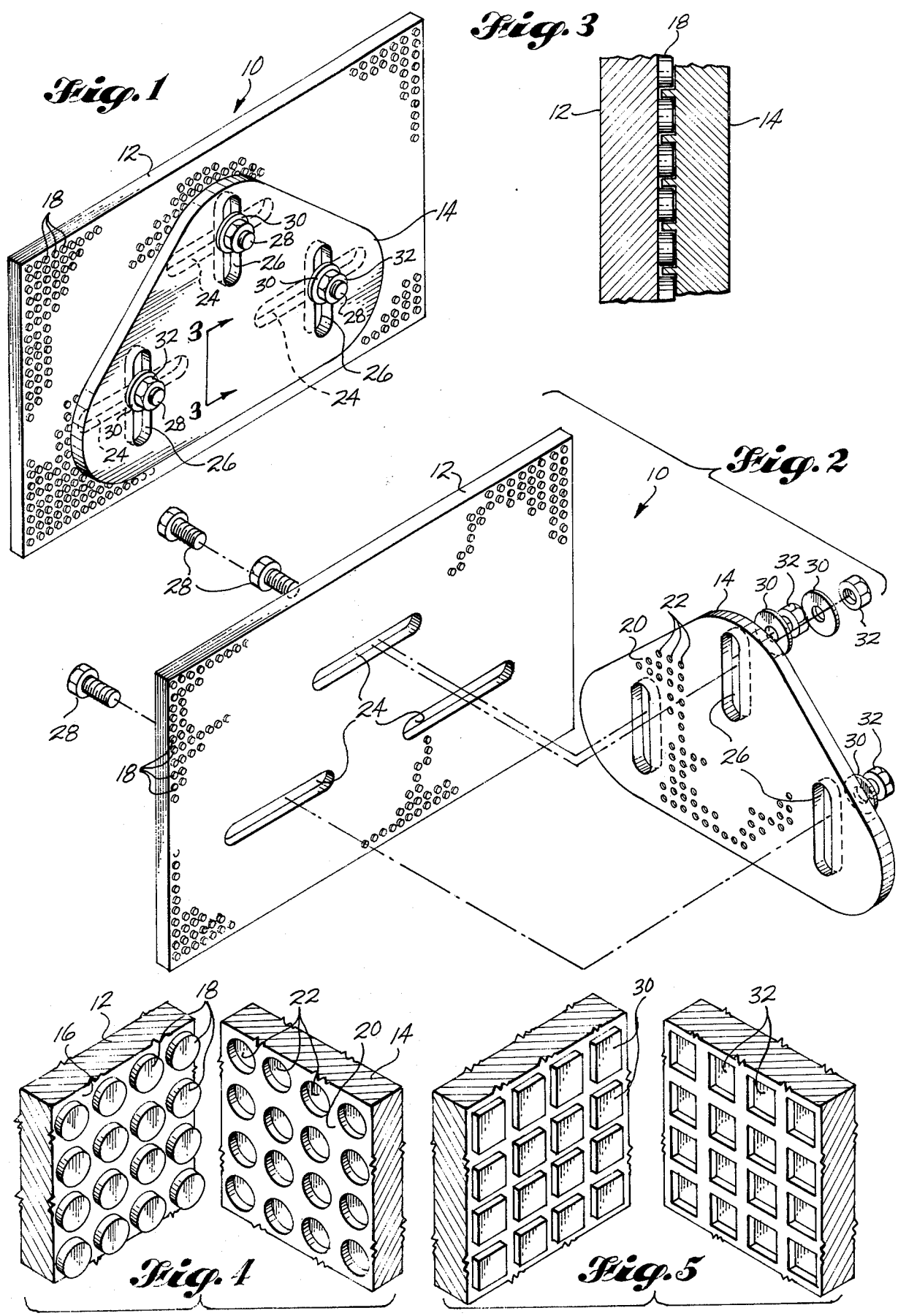

BI-DIRECTIONAL ADJUSTABLE COUPLINGS

BACKGROUND OF THE INVENTION

It is often desirable to have a means of effecting an adjustment between surfaces while also being able to lock the surfaces into the adjusted position. It is known to accomplosh this result by use of matching serrations on the two members. To make an adjustment, the surfaces are separated, moved with relation to each other, brought together again, and the parts fastened in place. If rotational movement is desired, the serrations extend radially; if reciprocal movement is desired, the serrations extend parallel to each other. When bi-directional adjustment is required, it is known to use three members instead of two. The middle member has serrations on one side extending parallel to each other and serrations on the other side extending normal to the first serrations. The outside members are serrated to match the side of the middle member being contacted. In U.S. Pat. No. 2,685,469, bi-directional adjustment was obtained by use of matching parallel serrations over a limited area of the surfaces, matching parallel serrations normal to the first serrations over a different limited area of the surfaces with clearance between the surfaces outside the serrated areas. It was found that bi-directional adjusting lightweight couplings would be obtained by use of a multiplicity of projections with matching recesses.

SUMMARY OF THE INVENTION

One of the members of the adjustable coupling has a multiplicity of projections extending outward from the surface. These projections are all arranged in a geometrical pattern in uniformly spaced, parallel, bi-directional alignment. A matching member has a multiplicity of recesses arranged to mate and lock with the first member when the two parts are brought together. The parts are joined with fasteners that may be loosened to allow adjustment.

It is an object of this invention to provide a lightweight positive locking bi-directional coupling.

DESCRIPTION OF THE DRAWINGS

FIG. 1 shows a perspective view of the bi-directional coupling of this invention.

FIG. 2 is a perspective exploded view of the coupling of FIG. 1.

FIG. 3 is a side elevational sectional view taken along lines 3—3 of FIG. 1.

FIG. 4 shows an enlarged view of fragmented perspective sections of the coupling of FIG. 2.

FIG. 5 shows a different embodiment of the coupling of FIG. 4.

DETAILED DESCRIPTION

Figures 6, 7:
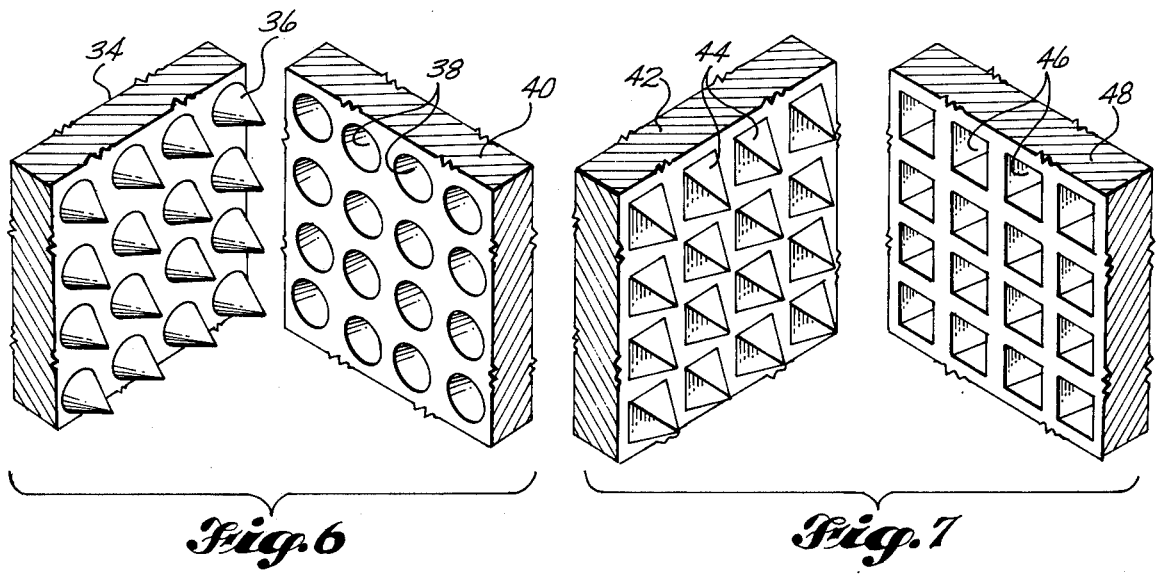
FIG. 6 shows another embodiment of the coupling of FIG. 4.
FIG. 7 shows yet another embodiment of the coupling of FIG. 4.

Adjustable coupling 10 has members 12 and 14 which operate in abutting relationship to each other. Extending outward from the surface 16 of the first member 12 is a multitude of similar projections 18 which are cylindrical in shape. These projections are uniformly arranged at equal distance from each other and extend in rows or lines parallel to each other in one direction, and also extend in lines parallel to each other in a direction normal to or, in other words, at 90° from the first rows.

Figures 8, 9, 11:
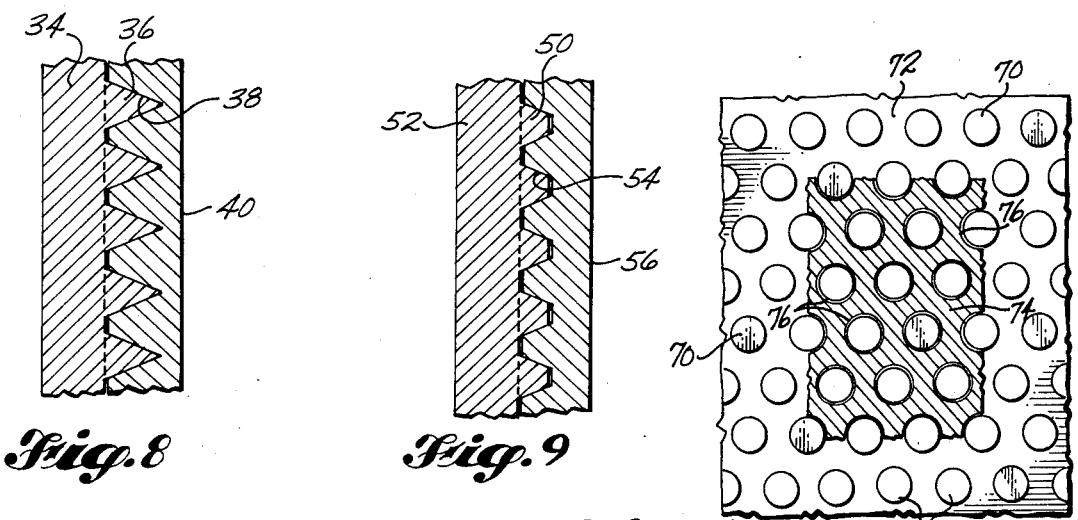
FIG. 8 is a side elevational sectional view as in FIG. 3, showing the embodiment as in FIG. 6.
FIG. 9 is a side elevational sectional view of yet another embodiment.
FIG. 11 shows a fragmented plan view of an alternate pattern of a coupling.

Surface 20 of the second member has a multitude of recesses 22 also arranged in bi-directional alignment and sized to accept the projections with a snug fit when the coupling members are brought together. The members when separated may be moved bi-directionally, then joined together to again become locked. To permit adjustment and locking, the first member has slots 24 which extend parallel to a line of the projections, and the second member has slots 26 which extend parallel to the projections at 90 degrees with the slots 24. The slots are aligned, preferably centered, on each other, bolts 28 inserted and locked with washers 30 and nuts 32. It is a simple matter to loosen the bolts, move the members apart, make an adjustment horizontally or vertically, and fasten the nuts to lock the members together again. This construction permits bi-directional adjusting and locking. The projection may be almost any shape as long as the spaces are uniform and the alignment is maintained. In FIG. 5, the projections 30 and recesses 32 are square. It is preferable, however, that the projections be tapered inward and the recesses be shaped accordingly to permit ease of insertion and alignment. Thus, FIGS. 6 through 9 show preferred embodiments. In FIG. 6, member 34 has conical projections 36 which mate with conical shaped recesses 38 in member 40. In FIG. 7, member 42 has pyramidal shaped projections 44 to mate with similar shaped recesses 46 in member 48. When the projections and recesses are tapered, the projections may be contiguous, instead of separated as shown, to obtain finer adjustment. Another preferred embodiment, as shown in FIG. 9, has frustum shaped projections 50 on member 52 which mate into frustum shaped recesses 54 in member 56. These projections, as shown in FIG. 9, may be either frusto-conical or frusto-pyramidal.

Figure 10:
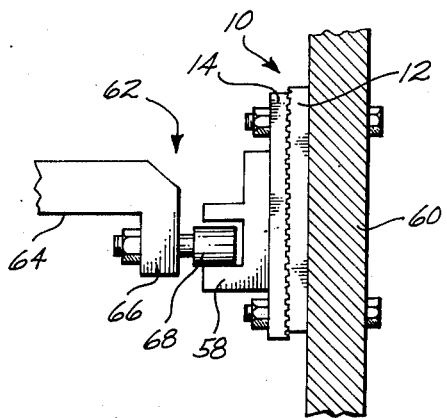
FIG. 10 shows a fragmented side elevational view with the coupling of this invention used to permit bi-directional adjustment of a door latch.

In FIG. 10, the bi-directional coupling 10 with members 12 and 14 is used to obtain adjustable alignment of a latch track 58 for a door 60. A latch 62 has a torque tube 64 with offset arm 66 for rotating a roller 68 into contact with the latch track and lock the door into position. The bi-directional coupling of this invention gives a lightweight coupling for adjustable latch control; however, it is not desired to limit this coupling to this use as it may be used in all applications where bi-directional adjustment is required.

FIGS. 1 and 2 showed a preferred method of fastening the adjustable mating members together, but it is not intended that the fastening be limited to that means as the members may be joined by any known means, such as with cams or clamps, to name a few.

Figure 12:
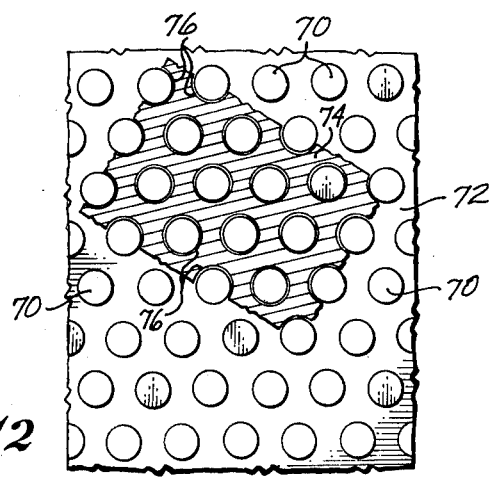
FIG. 12 shows a fragmented plan view of an alternate alignment of the coupling of FIG. 11.

When the pattern is symmetrical about one or more planes through the pattern, the coupling may be rotated between identical planes of symmetry. Thus, in the square pattern shown in FIGS. 1 through 9, the couplings may be moved bi-directionally at 90 degrees from each other; and, in addition, one of the members may be rotated 90° with respect to the other member and again permit bi-directional adjustment. When the pattern is arranged symmetrically at 60°, as is shown in FIGS. 11 and 12, the couplings may be adjusted bi-directionally at 90°; and, in addition, one of the members may be rotated 60° with respect to the other member and again permit bi-directional adjustment. In FIGS. 11 and 12, projections 70 of member 72 are arranged symmetrically at an angle of 60 degrees. Member 74 has recesses 76 to mate with the projections. In FIG. 12, member 74 has been rotated 60 degrees with respect to member 72. In either of these positions, bi-directional adjustments may be made.

I claim:

1. A coupling having bi-directional adjustment between a pair of matching members comprising: a first member having a series of uniformly spaced parallel rows of projections aligned to also extend in uniformly spaced parallel rows in a transverse direction, a second member shaped to accept and mate with the projections from the first member, means for adjustably locking the two surfaces together, and the projections are arranged in a pattern at 60° from each other to permit bi-directional movement at 90° and to permit 60° rotation between members and again permit bi-directional movement at 90°.

2. A coupling as in claim 1 wherein the projections are tapered inwardly.

3. A coupling having bi-directional adjustment between a pair of abutting members comprising: a first member having a multiplicity of inwardly tapered projections located in bi-directional alignment at 90°, and at least one slot through the member extending parallel to one direction of alignment of the projections; a second member having a multiplicity of recesses shaped and located to receive the projections from the first member to lock the two members when abutting, and at least one slot through the second member extending parallel to a second direction of alignment of the projections in the first member, said slot located to align to the slot in the first member; and means for fastening the two members together.

4. A coupling as in claim 3 wherein the projections are conical.

5. A coupling as in claim 3 wherein the projections are frusto-conical.

6. A coupling as in claim 3 wherein the projections are pyramid in shape.

7. A coupling as in claim 3 wherein the projections are frusto-pyramid in shape.

8. A coupling as in claim 3 wherein the means for fastening the two members comprises: a bolt extending through the aligned slots in the members and a nut to be loosened to allow relative movement between the two members and to lock the members together when the nut is tightened.

9. A coupling having bi-directional adjustment between a pair of matching members comprising: a first member having a series of uniformly spaced parallel rows of tapered projections aligned to also extend in uniformly spaced parallel rows in a transverse direction, at least one slot through the member to extend parallel to a row of tapered projections; a second member shaped to accept and mate with the projections from the first member, at least one slot through the second member aligned to extend in a transverse direction and to align to the slot in the first member, and a fastener to extend through the aligned slots to permit bi-directional adjustment between and locking of the two members.

10. A coupling as in claim 9 wherein the tapered projection is conical.

11. A coupling as in claim 9 wherein the tapered projection is pyramidal in shape.

* * * * *